United States Patent [19]

Auer

[11] Patent Number: 4,794,245

[45] Date of Patent: Dec. 27, 1988

[54] POSITION SENSOR

[75] Inventor: Siegfried Auer, Landover, Md.

[73] Assignee: Applied Research Corporation, Landover, Md.

[21] Appl. No.: 21,214

[22] Filed: Mar. 3, 1987

[51] Int. Cl.[4] .............................................. G01J 1/20
[52] U.S. Cl. ................................. 250/203 R; 126/425
[58] Field of Search ..................... 250/203 R, 203 S; 126/424, 425; 356/141, 152

[56] References Cited

U.S. PATENT DOCUMENTS

| | | | |
|---|---|---|---|
| 4,092,072 | 5/1978 | Ellis | 250/203 R |
| 4,211,922 | 7/1980 | Vaerewyck et al. | 250/203 S |
| 4,309,106 | 1/1982 | Smith | 250/203 R |
| 4,315,690 | 2/1982 | Trocellier et al. | 356/152 |
| 4,445,030 | 4/1984 | Carlton | 126/425 |

OTHER PUBLICATIONS

Advances In Electronics and Electron Physics, vol. 64A Interpolative Centroiding In CCD-Based Image Photon Counting Systems A. Boksenberg et al, 1985 pp. 33-46.

Primary Examiner—David C. Nelms
Attorney, Agent, or Firm—Kerkam, Stowell, Kondracki & Clarke

[57] ABSTRACT

A radiant energy angle sensor is provided wherein the sensitive portion thereof comprises a pair of linear array detectors with each detector mounted normal to the other to provide X and Y channels and a pair of slits spaced from the pair of linear arrays with each of the slits positioned normal to its associated linear array. There is also provided electrical circuit means connected to the pair of linear array detectors and to separate X and Y axes outputs.

11 Claims, 7 Drawing Sheets

POSITION SENSOR

This invention was made with government support under Contract No. NAS5-28763 awarded by NASA. The government has certain rights in portions of this invnntion.

This invention is directed to an angle position sensor and more particularly, an angle sensor;

to determine the angular position of the center of a bright source of light, such as the sun or the moon, with respect to a sensor-fixed coordinate system, and to generate electrical signals indicative of the position of the center of that light source;

to simultaneously cover a large field of view and provide a high angular resolution;

to provide high-resolution angular position information about the center, irrespective of the angular diameter, of a light source or of that portion of the light source that falls inside the field of view;

to track the source of light with a high time resolution;

to respond over a wide range of light fluxes;

to also respond to a flashing light;

to survive and operate in hostile environments;

and to be lightweight, small, relativly inexpensive, and using low power.

Sun and moon angle sensors have utility;

as an aid for navigating an airplane, a rocket, spacecraft, a boat, or other vehicle that uses a single bright source of light, such as the sun or the moon, for guidance;

an aid for automatically controlling the orientation, with respect to the angle of incidence of light, of light sensitive devices, such as:

to maximize the angle of illumination of a solar cell array on a spacecraft or;

to minimize the penetration of sunlight into the aperature of an astronomical telescope.

Such sensors also have utility s an aid for controlling, in conjuction with another type of attitude sensor (e.g., earth horizon sensor, star sensor, moon angle sensor, magnetometer), the pointing direction of a receiver or a transmitter of radiation (of fields or particles), mounted on a vehicle, e.g., the accurate pointing of the antenna of a communications satellite toward a specific area on the Earth, or the pointing of an astronomical telescope toward a specific area in the sky;

to provide sun angle information for the purpose of enabling the proper reduction and analysis of irradiance data from a sun observing instrument, such as the Shuttle Solar Backscatter Utraviolet (SSBUV) experiment.

The sensor may also be used as a generator of an alarm or command that activates a shutter, light diffuser, or other protective device in order to reduce the flux of light into a light sensitive instrument to a safe level. The sun angle sensor can be made to issue signal when the light source enters its field of view or a certain predetermined or programmable portion of it, e.g., a sun angle sensor of this type is used with the SSBUV to command a light diffuser to be moved into the light path of a very sensitive light detector (photomultiplier tube) whenever the sun comes within a certain angle of the SSBUV's field of view.

The sensor may be used in the applications listed above even when the light is flashing, such as an electronic strobe light.

BRIEF DESCRIPTION OF THE DRAWING

The invention will be more particularly described in reference to the following drawings.

DETAILED DESCRIPTION

A survey of spacecraft sun sensors can be found in NASA SP-8047 (June 1980) publication. Although hardware designs vary widely, sun sensor systems are designed to provide two basic output signal formats, analog and digital. In the analog systems, FIGS. 1 and 1(a), the output is a continuous function of the angle of incidence; in the digital systems, FIGS. 2 and 2(a), the output is discrete. FIGS. 1, 1(a), 2 and 2(a) illustrate the principles of each type.

Figure 1:
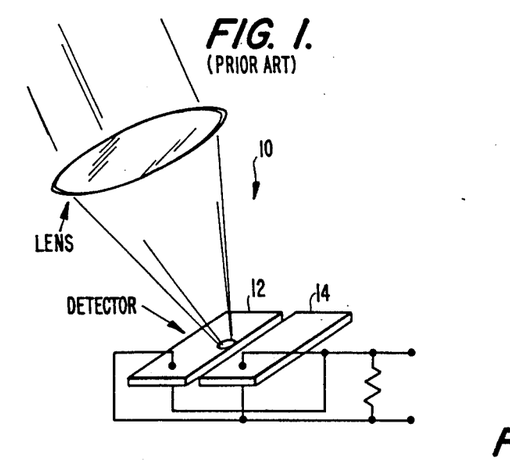
FIG. 1 illustrates one form of prior art analog sun sensor.

In the simple one-axis analog sensor 10, FIG. 1, the sun's image illuminates two closely spaced photosensitive elements 12 and 14. The difference between the current outputs developed across the two elements becomes the sensor output. As the illumination of both elements becomes nearly equal, the sensor output approaches zero. This is the null point of the sensor.

Figures 1A, 2, 2A:
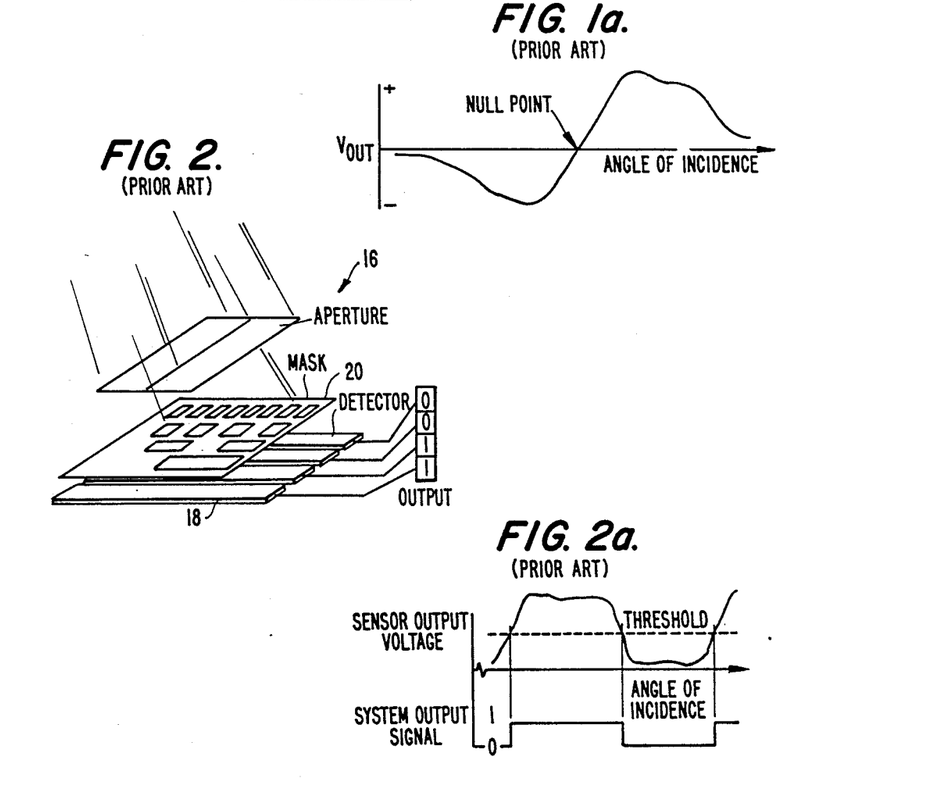
FIG. 1(a) illustrates the output signal from the detector of FIG. 1.
FIG. 2 illustrates another prior art digital type sun sensor.
FIG. 2(a) illustrates the output voltage and output signal from the device illustrated in FIG. 2.

In the digital sensor shown at 16, FIG. 2, the sun is imaged as a line across an array of separate elements. Each element 18 produces a 1 or 0 binary bit in the multichannel output, depending on whether light reaches the element through the mask 20 and whether the sensor's output in each channel exceeds threshold values established in associated circuitry. The binary number assigned to the channel identifies the position of the light imaged on the array of elements.

DISADVANTAGES OF PRIOR ART

1. The angular resolution is generally limited to one half of the angular radius of the light source (approximately 6 arc minutes in case of the sun). The resolution can be increased by utilizing interpolation techniques, but at the cost of increased optical and electrical complexity. Usually a coarse eensor and a fine sensor are needed when both wide field of view and high resolution are required.

2. Exhibits substantial crosstalk between X- and Y-axes. To obtain the angular component in one axis, readings in both axes must be taken and reduced following a known algorithm.

3. Proper operation is limited to a relatively narrow range of source brightnesses.

4. When tested with a solar simulator, the apparent angular diameter of the simulator must not exceed the apparent diameter of the sun.

5. High cost.

DETAILED DESCRIPTION OF THE PRESENT INVENTION

Figure 3:
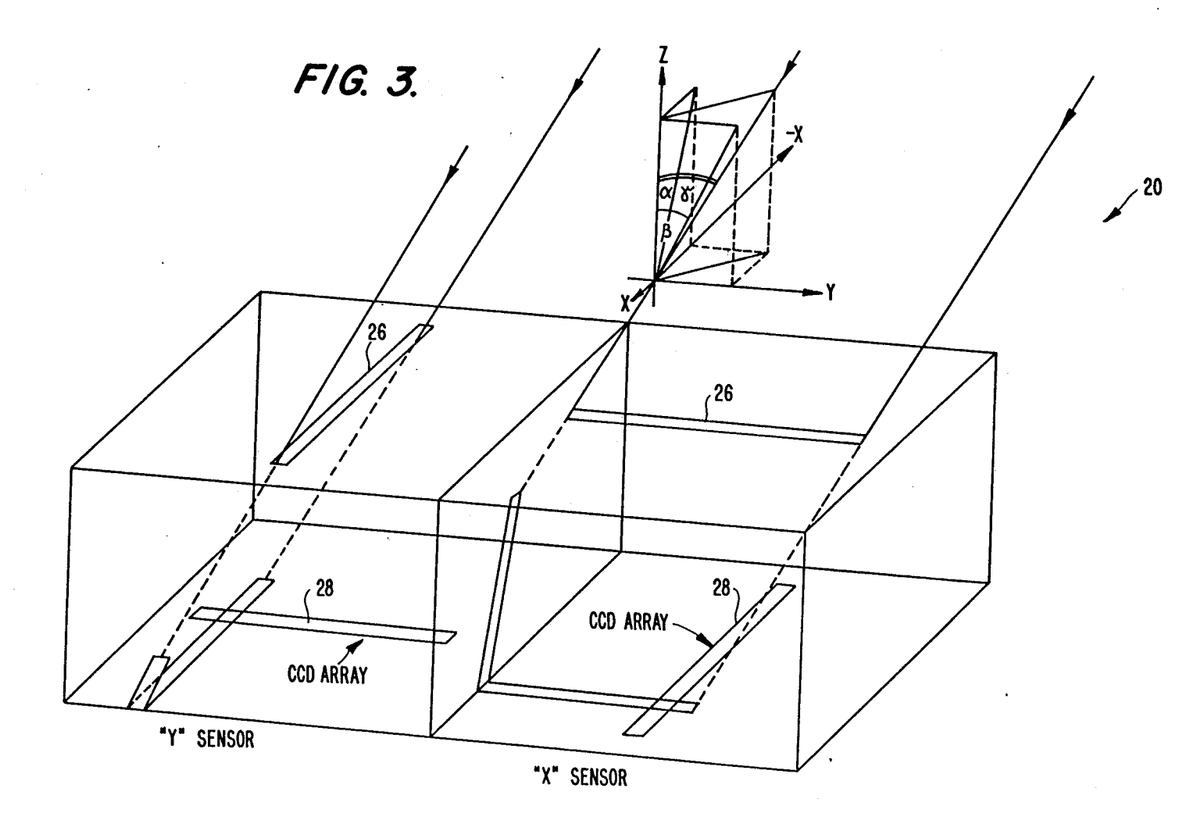
FIG. 3 is a schematic showing of the solar sensors determination of sun's angular position (x, y)
Figure 4:
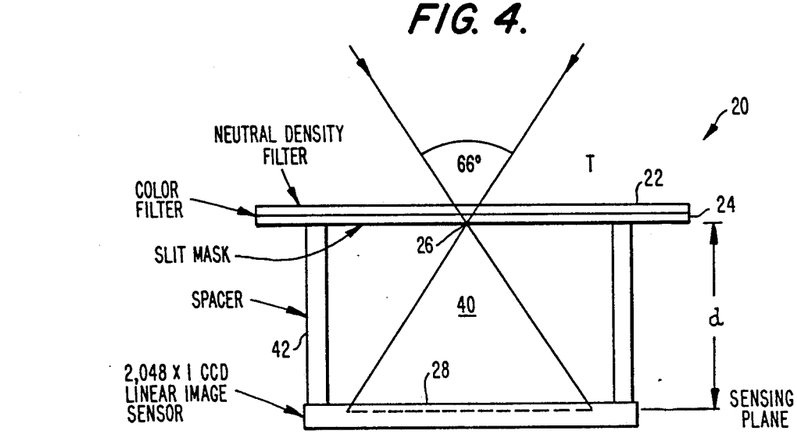
FIG. 4 diagramatically illustrates a solar aspect sensor optical subsystem on one of it's pair of axes.
Figure 6A:
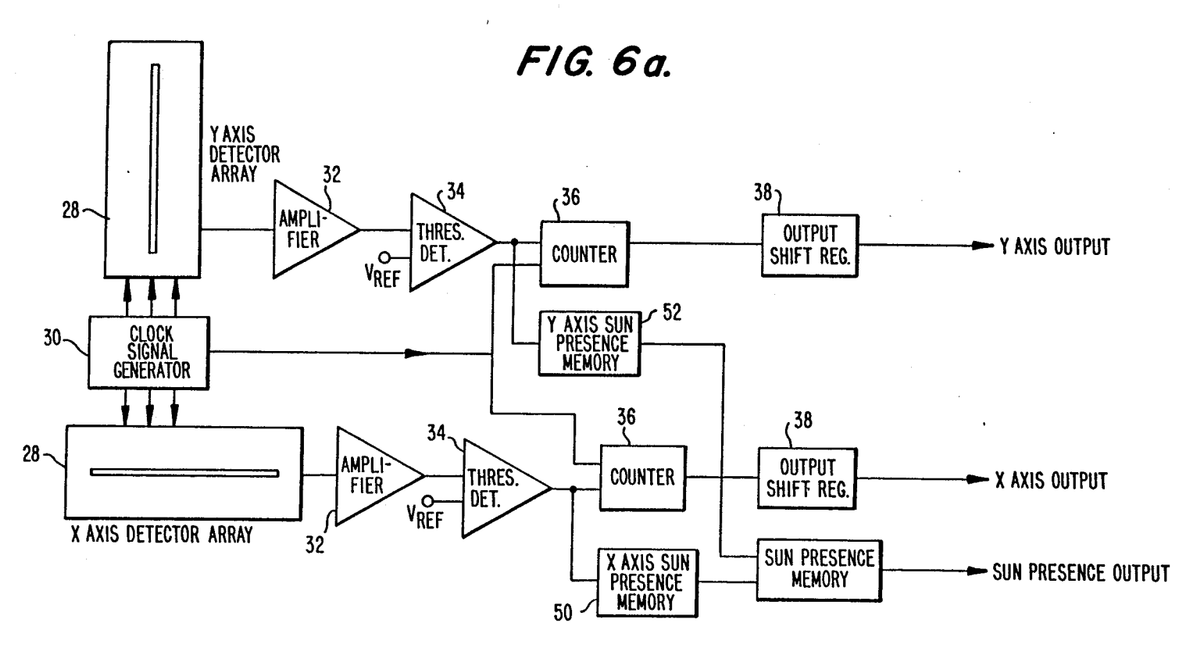
FIG. 6a is a schematic illustration of the sun angle sensor electronics of the present invention.

FIG. 3 and 4 schematically show the determination of the sun's angular position by a sun angle sensor of the A sun angle sensor 20 consists of an X- and Y-channel. Each channel consists of an optical subsystem comprising:
- a neutral density filter 22,
- an optical blue-green filter 24,
- an entrance slit 26, and
- a linear array of charge-coupled devices (CCD), or charge-injection devices (CID), or photodiodes, or an array of other light sensors 28; and
an electrical subsystem comprising: (FIG. 6)
- a clock signal generator 30,
- an analog signal amplifier 32,
- a voltage threshold detector 34,
- a pulse counter 36, and
- an output shift register 38.

Referring to FIG. 4, sunlight entering from the top T will pass, first, through the neutral density filter 22, whereby it is attenuated to avoid overexposure of the array elements. A typical factor of attenuation is 200:1. The filter is of a reflective type and also serves as a reference mirror for both internal and external alignment. Typically, this filter is a film of Inconel applied to the front surface of the color filter 24 having the proper thickness to achieve the required attenuation.

Second, light will pass through the blue-green filter 24, such as type BG38 made by Schott Glass Corporation. This filter serves the following purposes:

While absorbing the red and infrared portions of the solar radiation, it transmits the green, blue, and ultraviolet portions. CCD arrays are known to exhibit a higher modulation transfer function for green, blue, and ultraviolet than for red and infrared rays; as a result, the contrast near the solar limb will be translated into larger voltage steps by the CCD array.

Because of solar limb darkening, the sun appears brighter in the center. This feature is more pronounced for green, blue, and ultraviolet than for red and infrared solar rays. Thus, the benefit of using the filter will be a narrower profile of the sun on the array.

Widening of the sun's image due to diffraction at the slit is less pronounced at shorter wavelengths; as a result, the sun's profile on the CCD array will be narrower when using a blue-green filter.

Solar radiation at wavelengths shorter than 300 nm is known to be highly variable with time and more importantly, with source location on the sun; i.e., the sun is often brighter on its left side than on its right side, or vice versa, with a resulting angular offset between its center of light (being measured) and its center of mass (being published in ephemeris tables). The color filter absorbs this variable portion of the spectrum, thus minimizing such angular offset or error.

The filter also serves as the substrate for both neutral density filter (on its front face) and slit mask (on its back surface).

Third, a small portion of the sunlight will pass through the entrance slit 26. The mask is made of a film of opaque material, such as chromium, with the area of the slit etched out. The slit width is typically 100 micrometers. The slit mask restricts the field of view (FOV) of each cell of the array in the direction parallel to the array but leaves a wide acceptance angle in the cross direction. Each detector element receiving sunlight must lie in a plane that contains the element, the slit, and the sun. The position of the illuminated detector elements is, thus, indicative of the angle between sun and sensor axis.

Fourth, sunlight passes through an empty space 40 (vacuum) and then impinges on the array of detectors 28. The array is parallel to the slit mask and at a right angle to the slit. The distance, d, between slit mask and the array is held constant by a spacer. Typically, d=20 mm. The thermal expansion coefficients of the materials of the spacer and of the array, and of the substrate of the slit mask (i.e., color filter) should, ideally, be identical to assure that angular relations are invariable with temperature changes. In reality, the color filter and the spacer should be made of materials whose thermal expansion coefficients are similar to that of the array substrate. For example, the following combination was found to be a good match:

| Component | Expansion $\times 10^{-7}/°C.$ |
|---|---|
| Color Filter (Schott BG38) as Substrate of the Slit Mask | 70 |
| Spacer Between Filter and Array (Schott BK7 Glass) | 71 |
| Array Bar (Silicon) | 76 |
| Array Package (Ceramic) | 60 ... 70 |

Figure 5:
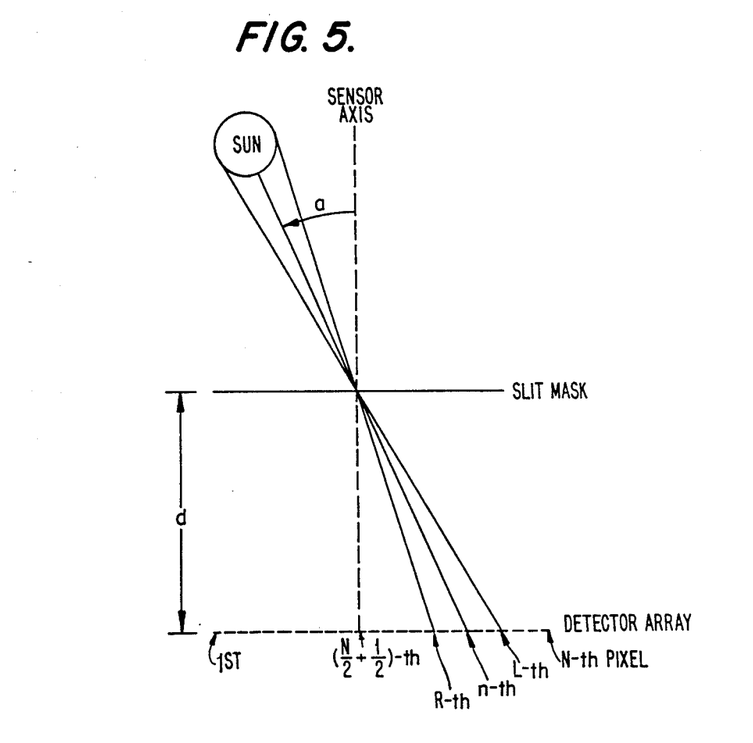
FIG. 5 illustrates the geometrical relation between sun angle and position of illuminated detector elements.

For the relation between sun angle and position of sun-illuminated elements within the array, refer to FIG. 5. If the total number of elements in an array is N, if the center-to-center distance between adjacent elements is X, further if the center of the solar image on the array coincides with the center of the n-th element, and if the center of the array coincides with the sensor axis, then the sun angle $\alpha$ is $$\alpha = \arctan \left[ \frac{x\left(n - \frac{N+1}{2}\right)}{d} \right]$$

Solar photons create electron-hole pairs in the silicon of the illuminated detector elements of the array. The electrons are collected in the elements. The quantity of charge accumulated in each element is a linear function of the incident flux of light and the exposure time.

Figure 7A:
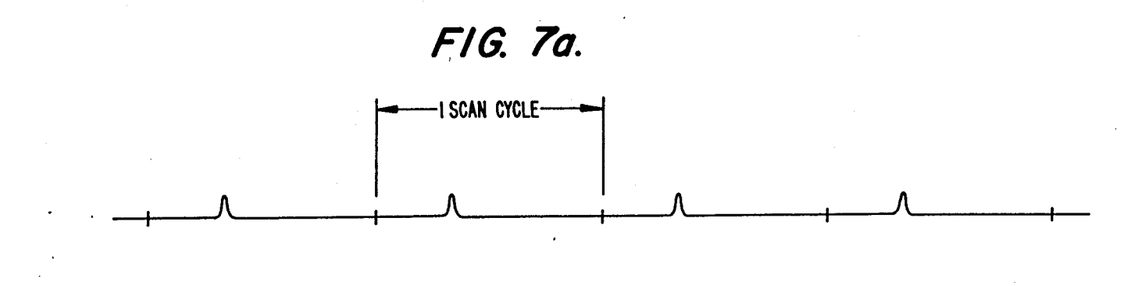
FIG. 7(a) illustrates the solar sensor detection of a solar disc.
Figure 7B:
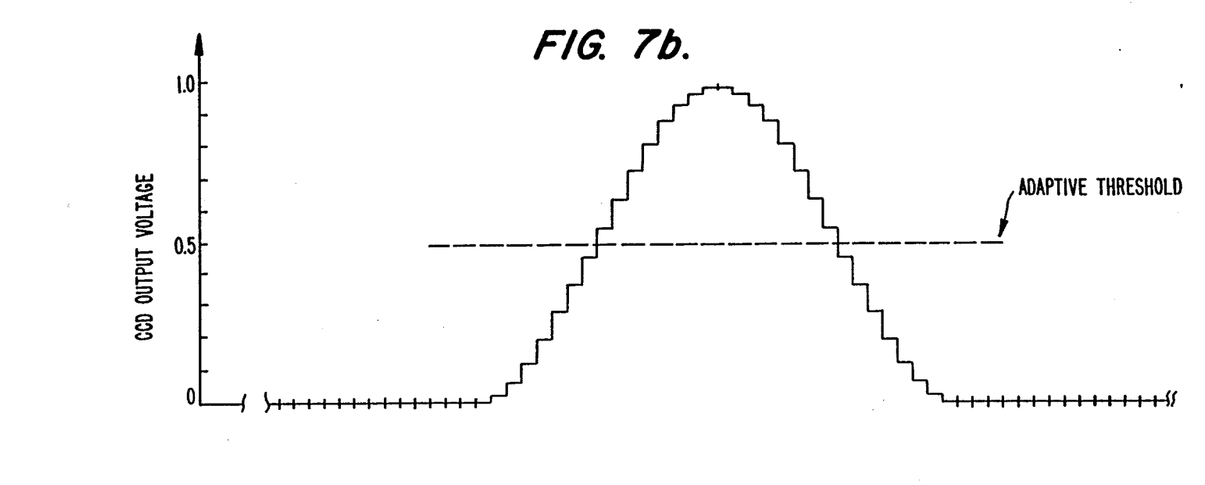
FIG. 7(b) illustrates the brightness profile of a solar disc using of the present invention.

At the end of an exposure period, the charge packets from the photosensitive elements are transferred, all simultaneously and under the control of a Transfer Clock, into transfer shift registers which are built into the array 28 and which serve as temporary analog storage registers. They are then serially shifted through the transfer shift registers, to a charge sensitive output amplifier 31 under the control of a Transport Clock. FIG. 7 schematically shows the output signal of an array, actually a sequence of discrete voltage levels, each corresponding to the charge collected in one of the detector elements (Pixels).

The output signal of the array is fed into the linear amplifier 32 and from there into the voltage threshold detector 34. Simultaneously, at the beginning of each readout sequence, the counter 33 is reset to zero andt- then incremented by 2 counts with each pixel being read out. The counter is being incremented by 2 until (whnn detecting the right edge of the sun at pixel number R) the output level exceeds a preset or adaptive threshold (typically set at 50 percent of maximum). For each pixel whose collected charge exceeds the threshold, the count is incremented by 1. When the array output signal drops below the threshold (when detecting the left edge of the sun at pixel number L), the countrr is not incremented further. The contents of the counter is then a number, 2n, indicative of the average of pixel positions (L and R) of left and right edges of the sun, or:

$$2R+(L-R)=2n$$

where n is the number of the pixel that is at the center of the solar image on the array.

At the end of a readout sequence, the contents of the counter, 2n, is transferred into an output shift register 38. This register is readout by the user for calculating the sun angle.

Figure 8:
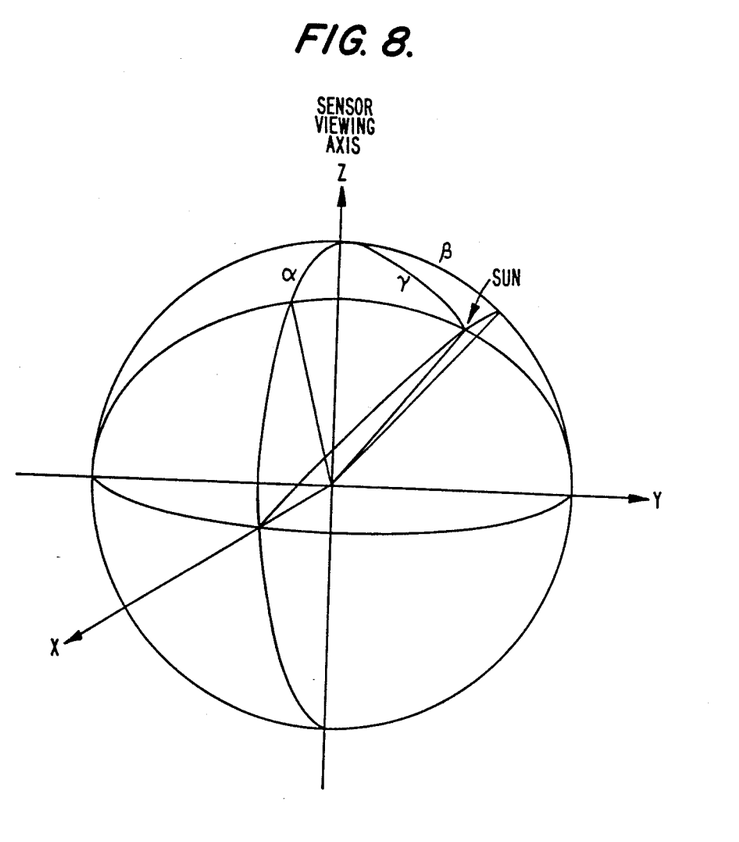
FIG. 8 is a diagramatic showing of the sun's coordinates in the sensor's coordinate system.

The operation is simultaneously performed with two identical but mutually perpendicular channels in order to obtain both components of the sun angle, $\alpha$ and $\beta$. FIG. 8 shows the sun's coordinates in the sun sensor's coordinate system. The total angle, can be calculated from:

$$\tan^2\gamma=\tan^2\alpha+\tan^2\beta$$

Whenever the threshold is exceeded in the X channel, the "X axis sun presence memory" 50 is set to a high state. Likewise, a "Y axis sun presence memory", 52 is set to a high state, when the threshold is exceeded in the Y channel. If both memories have been set during a readout sequence, a "sun presence" output goes to a high state to indicate that the sun has been detected in both channels. This output is reset to a low state, when the sun has not been detected in both channels during one full exposure period.

Figure 6B:
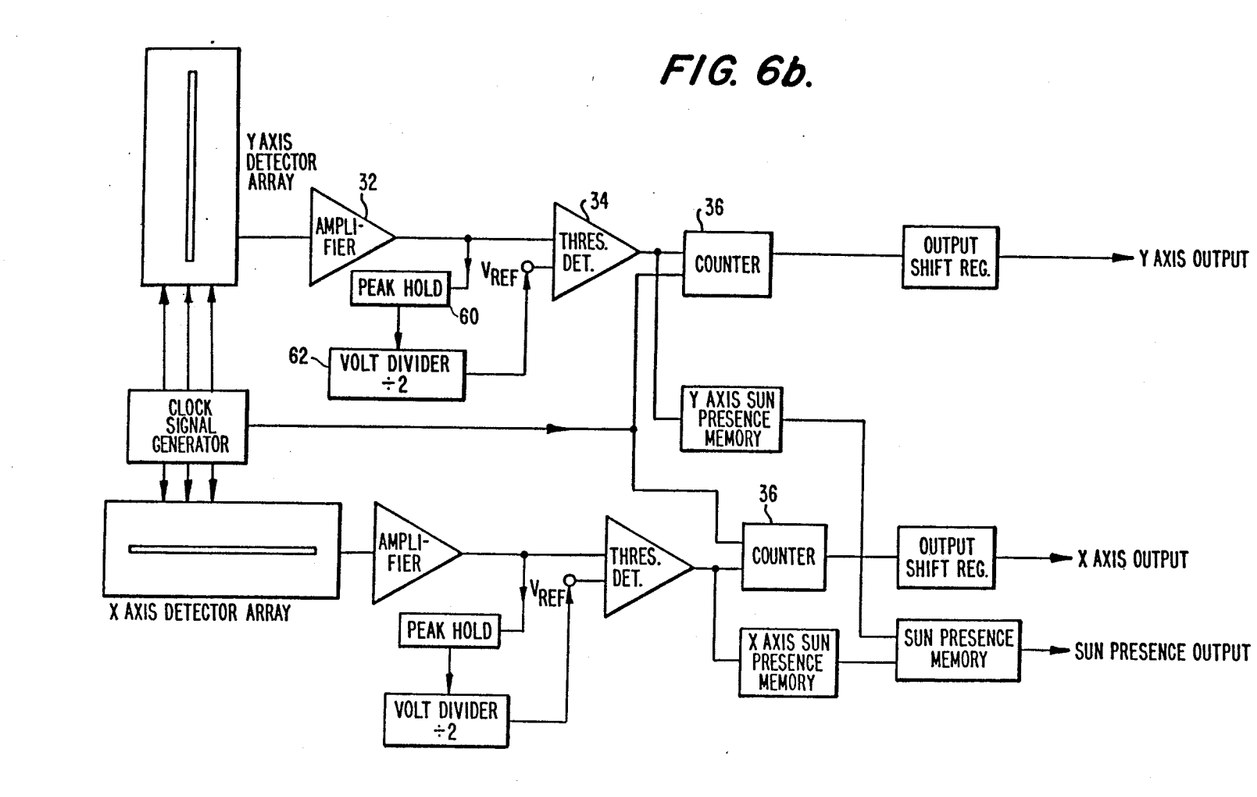
FIG. 6b is a schematic illustration of the sun angle sensor electronics having drastically increased accuracy.

ALTERNATE EMBODIMENTS OF THE INVENTION (1) Automatic Adjustment of the Reference Voltage Adapted to the Brightness of the Light Source Referring now to FIG. 6b, there is illustrated circuitry wherein the threshold voltage is automatically aapted to the brightness of the light source. The threshold voltage $V_{REF}$ is set at a level at about 50% of the maximum signal voltage of the preceding scan. To achieve this, a Peak Hold circuit 60 holds the last maximum voltage from the amplifier 32. The Peak Hold voltage is directed to a voltage divider circuit 62 which divides that voltage by two and feeds the results into the $V_{ref}$-input of the threshold detector 34. Each of the X and Y detector arrays are provided with such Peak Hold circuit and voltage divider as illustrated in FIG. 6b.

It will also be recognized that the sensor of the invention also responds to a flashing light source such as an electronic strobe. When a flash occurs during any given exposure period, the counters, such as counters 36 FIG. 6a and 6b, store the data indicating the coordinates of the source while it flashed. Simultaneously, a sun presence signal is generated. Until the next flash occurs, the data continued to be stored in the registers can be read out repeatedly. However, the sun present signal goes low between flashes, indicating that the data have been taken prior to the present exposure period.

(2) Moon Angle Sensor

A moon angle sensor can be manufactured differing from a sun sensor in the following components:
omit neutral density filter; and
increase exposure time of detection array by slowing down the frequency of all clock signals.

(3) Sun Angle Sensor With Very High Accuracy

When a single threshold is used to detect the two pixels containing the left and right edges of the Sun's image on the array, the sensor's accuracy cannot ee better than 0.5 pixel.

A much greater accuracy (such as 0.01 pixel) is achieved by determining the location of the light center of the Sun's image (centroiding). To make full use of this method, additional electronic circuits and a microcomputer are needed. Specifically, the following steps are included:

1. Record the voltage levels for all pixels that exceed the noise voltage;
2. Correct these voltage levels for pixel-to-pixel variations of detector background and sensitivity, using a list of pre-recorded correction factors; and
3. Compute the location of the light center from the voltage levels and associated pixel positions.

A method for performing step (3) has been described by Boksenberg et al. in *Advances in Electronics and Electron Physics*, Vol. 64A, p. 33–47, 1985. Other methods can be used with similar results.

A method of obtaining pre-recorded correction factors step (2) would be to obtain a dark fiedd background voltage and then after illuminating the X and Y axes with a source of light obtain a second reading from which the background reading is subtracted to provide the pre-recorded correction factors.

Advantages of invention over prior art include:
low cost,
low power,
high angular accuracy and wide field of view obtained from a single sensor,
high time resolution,
no cross talk between axes, and
operates over wide range of light intensities.

I claim:

1. A radiant energy angle sensor comprising an evacuated radiant energy chamber within a housing, a pair of linear array of detectors in said chamber and mounted at one end of the housing with said arrays positioned normal to each other to provide X and Y channels, a pair of slits at the opposite end of the housing, each of said slits positioned perpendicular to an associated one of the linear arrays, and electrical circuit means connected to the detectors and having separate X and Y axis outputs, said X and Y axis outputs being representative of the angle at which radiation strikes the sensor as measured by the passing of radiation through the slits and determination of the position at which the line of radiation passing through one of the slits crosses the associated array, there being a lens-free radiation path from outside said housing to said arrays.

2. The invention defined in claim 1 when the linear arrays comprise charge-coupled devices.

3. The invention defined in claim 1 including a neutral density filter positioned adjacent said slit at the opposite end of the housing from linear array detectors.

4. The invention defined in claim 3 including a blue-green filter positioned below the neutral density filter and above the entrance slits.

5. The radiant energy sensor as defined in claim 1 wherein the electrical circuit means includes a clock signal enerator connected to each array for serially outputting signals from each detector within an array, an analog signal amplifier connected to at least one of the arrays for amplifying signals from said one array, a voltage threshold detector connected to receive an output from the amplifier, a pulse counter connected to receive an output from the voltage threshold detector, and an output shift register connected to receive an output from the pulse counter.

6. The radiant energy angle sensor as defined in claim 1 wherein the electrical circuit means includes two analog signal amplifiers, each analog signal amplifier connected to receive output from a corresponding array, the electrical circuit means further comprising two voltage threshold detectors, each connected to receive an output from a corresponding one of the analog signal amplifiers, two pulse counters, each connected to receive an output from a corresponding voltage threshold detector, and two output shift registers, each output shift register connected to receive an output from a corresponding one of the pulse counters.

7. The radiant energy angle sensor as defined in claim 1 wherein the electrical circuit means includes a peak hold detector connected to store a peak corresponding to an associated array, a threshold detector connected to receive a signal representative of the output of a corresponding array, and a voltage divider receiving a signal from the peak hold detector and connected to supply a signal to provide a voltage reference for the threshold detector.

8. The radiant energy sensor as defined in claim 1 further comprising a blue-green filter attached to said housing such that it filters radiation falling on the arrays.

9. A radiant energy angle sensor comprising an evacuated radiant energy chamber within a housing, a pair of linear array detectors, mounted at one end of the housing with said arrays positioned normal to each other to provide X and Y channels, a pair of slits positioned perpendicular to an associated one of the linear arrays, and electrical circuit means connected to each of the detectors and having separate X and Y axis outputs, said circuit means includes a pair of peak hold detectors with one of said peak hold detectors corresponding to the X axis output and the other corresponding to the Y axis output, voltage divider means connected to the peak hold detectors with the output of the voltage dividers supplied as voltage references for threshold detectors, there being one for each of the Y and X axis outputs, each peak hold detector storing a peak corresponding to an associated array, said X and Y axis outputs being representative of the angle at which radiation strikes the sensor as measured by the passing of radiation through the slits and determination of the position at which the line of radiation passing through one of the slits crosses the associated array, there being a lens-free radiation path from outside said housing to said array.

10. A method of determining the angle of a source of radiant energy from a preselected point including the steps directing the radiant energy through a pair of slits positioned normal to each other onto a pair of linear array detectors also mounted normal to each other and normal to the corresponding slit, each array having pixels providing a voltage level responsive to the radiant energy; and recording the voltage levels for all pixels of the linear arrays that exceed the noise voltage of each pixel with pre-recorded correction factors and computing the center of the source of radiant energy from the voltage levels and pixel positions in the pair of linear arrays and wherein there is a lens-free radiation path from the source to each array.

11. The method of determining the angle of a source of radiant energy from a preselected point as defined in claim 10, wherein the pre-recorded correction factors are obtained from a dark field background voltage of the pair of linear array detectors subtracted from the voltage of the pair of linear array detectors illuminated with a source of light.

* * * * *

UNITED STATES PATENT AND TRADEMARK OFFICE
CERTIFICATE OF CORRECTION

PATENT NO. : 4,794,245

DATED : December 27, 1988

INVENTOR(S) : Siegfried AUER

It is certified that error appears in the above-identified patent and that said Letters Patent is hereby corrected as shown below:

Column 7, line 2, "slit" should be --slits--.

Column 7, line 3, insert --the-- before linear.

Column 7, line 9, "enerator" should be -generator-.

Signed and Sealed this

Second Day of May, 1989

Attest:

DONALD J. QUIGG

*Attesting Officer*   *Commissioner of Patents and Trademarks*